US008745234B2

(12) United States Patent
Liu et al.

(10) Patent No.: US 8,745,234 B2
(45) Date of Patent: Jun. 3, 2014

(54) METHOD AND MANAGER PHYSICAL MACHINE FOR VIRTUAL MACHINE CONSOLIDATION

(75) Inventors: Hsiao-Fei Liu, Taipei County (TW); Tzi-Cker Chiueh, Taipei (TW); Jui-Hao Chiang, New York, NY (US); Che-Lun Hung, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

(21) Appl. No.: 12/978,364

(22) Filed: Dec. 23, 2010

(65) Prior Publication Data

US 2012/0166644 A1 Jun. 28, 2012

(51) Int. Cl.
G06F 15/173 (2006.01)
G06F 9/455 (2006.01)
G06F 9/46 (2006.01)

(52) U.S. Cl.
USPC .............. 709/226; 718/1; 718/103; 718/104; 718/105

(58) Field of Classification Search
None
See application file for complete search history.

(56) References Cited

U.S. PATENT DOCUMENTS

| 7,539,841 | B2 | 5/2009 | Rawson, III | |
|---|---|---|---|---|
| 7,543,166 | B2 | 6/2009 | Zimmer et al. | |
| 7,783,779 | B1 * | 8/2010 | Scales et al. | 709/240 |
| 8,255,516 | B1 * | 8/2012 | Zhang et al. | 709/224 |
| 2006/0069761 | A1 * | 3/2006 | Singh et al. | 709/222 |
| 2008/0295096 | A1 * | 11/2008 | Beaty et al. | 718/1 |
| 2009/0204826 | A1 * | 8/2009 | Cox et al. | 713/320 |
| 2010/0082320 | A1 * | 4/2010 | Wood et al. | 703/22 |
| 2010/0262974 | A1 * | 10/2010 | Uyeda | 718/105 |
| 2010/0281478 | A1 * | 11/2010 | Sauls et al. | 718/1 |
| 2011/0321041 | A1 * | 12/2011 | Bhat et al. | 718/1 |

FOREIGN PATENT DOCUMENTS

| TW | 201030531 | 8/2010 |
|---|---|---|
| WO | 2010117888 | 10/2010 |

OTHER PUBLICATIONS

Chris Hyser, Autonomic Virtual Machine Placement in the Data Center, Feb. 2008, HP Laboratories, HPL-2007-189, pp. 1-10.*
VMware Inc., Resource Management Guide, Jul. 2008, VMware Inc., Jun. 12, 2009, p. 108.*
Yoo-Ah Kim, Data migration to minimize the total completion time, Aug. 2004, Elsevier Inc., Journal of Algorithms 55 (2005), pp. 42-57.*
Shuchi Chawla, Edge Disjoint Paths; Dynamic Programming, Feb. 2007, University of Wisconsin-Madison, vol. 1, pp. 1-5.*
Rajiv Gandhi, Combinatorial Algorithms for Data Migration to Minimize Average Completion Time, Aug. 2008, Rutgers University, LNCS 4110, pp. 128-139.*

(Continued)

*Primary Examiner* — Douglas Blair
*Assistant Examiner* — Imran Moorad
(74) *Attorney, Agent, or Firm* — Jianq Chyun IP Office

(57) ABSTRACT

A method and a manager physical machine (PM) for virtual machine (VM) consolidation are provided. The method is performed by the manager PM. A network connects the manager PM and a plurality of server PMs. A plurality of VMs is running on the server PMs. The method includes the following steps. The manager PM classifies the server PMs into redundant PMs and surviving PMs. The manager PM determines migration paths of the VMs running on the redundant PMs to the surviving PMs. The manager PM determines a parallel migration sequence of the VMs running on the redundant PMs based on the migration paths. The manager PM migrates the VMs running on the redundant PMs to the surviving PMs in parallel according to the parallel migration sequence.

30 Claims, 13 Drawing Sheets

(56) References Cited

OTHER PUBLICATIONS

James Hamilton's blog, "Cost of Power in Large-Scale Data Centers", posted on Nov. 28, 2008, retrieved from http://perspectives.mvdirona.com/2008/11/28/CostOfPowerInLargeScaleDataCenters.aspx.

John E. Hoperoft et al., "A n5/2 Algorithm for Maximum Matchings in Bipartite Graphs", SIAM Journal on Computing, vol. 2, No. 4, pp. 122-125(225-231), Dec. 1973.

XiaoYing Wang et al., "Appliance-based Autonomic Provisioning Framework for Virtualized Outsourcing Data Center", Fourth International Conference on Autonomic Computing (ICAC'07), Jun. 11-15, 2007, 10 pages begin on p. 29.

Gunjan Khanna et al., "Application Performance Management in Virtualized Server Environments", Network Operations and Management Symposium, 2006. (NOMS 2006.) 10th IEEE/IFIP, Apr. 3-7, 2006, pp. 373-381.

Hien Nguyen Van et al., "Autonomic virtual resource management for service hosting platforms", IEEE International Conferences on Software Engineering Workshop on Software Engineering Challenges of Cloud Computing, 2009. (CLOUD '09.), May 23, 2009, pp. 1-8.

Boaz Patt-Shamir et al., "Vector Bin Packing with Multiple-Choice", in Scandinavian Symposium and Workshops on Algorithm Theory, SWAT 2010, Jun. 21-23, 2010, pp. 248-259.

Timothy Wood et al., "Black-box and Gray-box Strategies for Virtual Machine Migration", 4th USENIX Symposium on Networked Systems Design & Implementation, Dec. 3, 2009, pp. 229-242 of the Proceedings.

Tolia, Niraj et al., "Delivering Energy Proportionality with Non Energy-Proportional Systems—Optimizing the Ensemble", in USENIX Workshop on Power Aware Computing and Systems, Nov. 13, 2008, 5 pages begin on p. 2.

Norman Bobroff et al., "Dynamic Placement of Virtual Machines for Managing SLA Violations", In IEEE/IFIP International Symposium on Integrated Network Management, IEEE (2007), May 21, 2007, p. 119-128.

Shekhar Srikantaiah et al., "Energy Aware Consolidation for Cloud Computing", in USENIX Workshop on on Power Aware Computing and Systems, Dec. 7, 2008, total 5 pages.

Fabien Hermenier et al., "Entropy: a Consolidation Manager for Clusters", In ACM SIGPLAN/SIGOPS International Conference on Virtual Execution Environments, Sep. 11, 2008, total 26 pages.

Nikhil Bansal et al., "Improved approximation algorithms for multi-dimensional bin packing problems", 47th Annual IEEE Symposium on Foundations of Computer Science, 2006. (FOCS '06.), Oct. 2006, pp. 697-708.

Nikhil Bansal et al., "Polynomial Approximation Schemes for Smoothed and Random Instances of Multidimensional Packing Problems", SODA '07 Proceedings of the eighteenth annual ACM-SIAM symposium on Discrete algorithms, pp. 1207-1216, Year 2007.

Jussara Almeida et al, "Resource Management in the Autonomic Service-Oriented Architecture", Autonomic Computing, 2006. (ICAC '06.), IEEE International Conference, pp. 84-92, Jun. 13-16, 2006.

N. Hall, S. et al. "Bin Packing Problems in One Dimension: Heuristic Solutions and Confidence Intervals," Computers & Operations Research. vol. 15, No. 2, Year 1988, pp. 171-177.

Chris Hyser et al., "Autonomic Virtual Machine Placement in the Data Center," HP Laboratories, Feb. 26, 2008, pp. 1-12.

"Office Action of Taiwan Counterpart Application", issued on Oct. 21, 2013, p. 1-p. 9, in which the listed references were cited.

"Office Action of China Counterpart Application", issued on Jan. 30, 2014, pp. 1-8.

\* cited by examiner

METHOD AND MANAGER PHYSICAL MACHINE FOR VIRTUAL MACHINE CONSOLIDATION

BACKGROUND OF THE DISCLOSURE

1. Field of the Disclosure

The present disclosure relates to a method and a manager physical machine (PM) for virtual machine (VM) consolidation.

2. Description of the Related Art

Nowadays data centers are more important than ever because of the trend of cloud computing. A typical data center includes hundreds or thousands of PMs, such as servers. Each PM may accommodate multiple VMs to run on it. Customers of the data center may lease VMs to run their software applications. This infrastructure based on VMs is more manageable and profitable for the operators of data center than an infrastructure based directly on PMs is. A PM with multiple VMs can serve multiple customers at the same time. Enforcing resource quotas available to customers is easier through VMs than through PMs. Moreover, VMs are more robust than PMs are because a VM can migrate to another PM in the event of PM malfunction without interrupting the services provided to customers.

Power bills are a heavy burden for operators to run their large scale data centers. The proportion of the cost of power consumptions to the total operating cost of the entire hardware infrastructure may be as high as 20%. Reduction of the clock frequencies and power management modes of the processors do not help much because the power consumption of some components of the PMs, such as memories and hard disks, is not affected by the clock frequencies and power management modes of the processors. The best way to save electric energy is turning off the power supply to redundant PMs completely.

SUMMARY OF THE DISCLOSURE

Accordingly, the present disclosure is directed to a method for VM consolidation. The method try to minimize the number of PMs required without degrading the performance of individual VMs. In other words, the method try to maximize the number of redundant PMs to turn off by consolidating the VMs onto a minimum number of surviving PMs.

The present disclosure is also directed to a manager PM for VM consolidation. The manager PM executes the aforementioned method for VM consolidation. The manager PM try to minimize the number of VM migrations required for VM consolidation. In addition, the manager PM migrates the VMs in parallel, thus minimizing the time required to complete all the VM migrations.

According to an embodiment of the present disclosure, a method for VM consolidation is provided. The method is performed by a manager PM. A network connects the manager PM and a plurality of server PMs. A plurality of VMs is running on the server PMs. The server PMs provide N resources and the VMs consume the resources. N is a preset positive integer. The method includes the following steps. The manager PM classifies the server PMs into redundant PMs and surviving PMs, wherein the VMs running on the redundant PMs can migrate to the surviving PMs successfully according to an interleaved N-dimensional best-fit decreasing packing algorithm. The manager PM determines migration paths of the VMs running on the redundant PMs to the surviving PMs according to the interleaved N-dimensional best-fit decreasing packing algorithm and the topology of the network. The manager PM determines a parallel migration sequence of the VMs running on the redundant PMs based on the migration paths. The manager PM migrates the VMs running on the redundant PMs to the surviving PMs in parallel according to the parallel migration sequence.

According to another embodiment of the present disclosure, a manager PM is provided. The manager PM includes a memory and a processor coupled to the memory. The processor performs the aforementioned method for VM consolidation and stores the data generated in and used by the steps of the method, such as the migration paths and the parallel migration sequence, in the memory.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
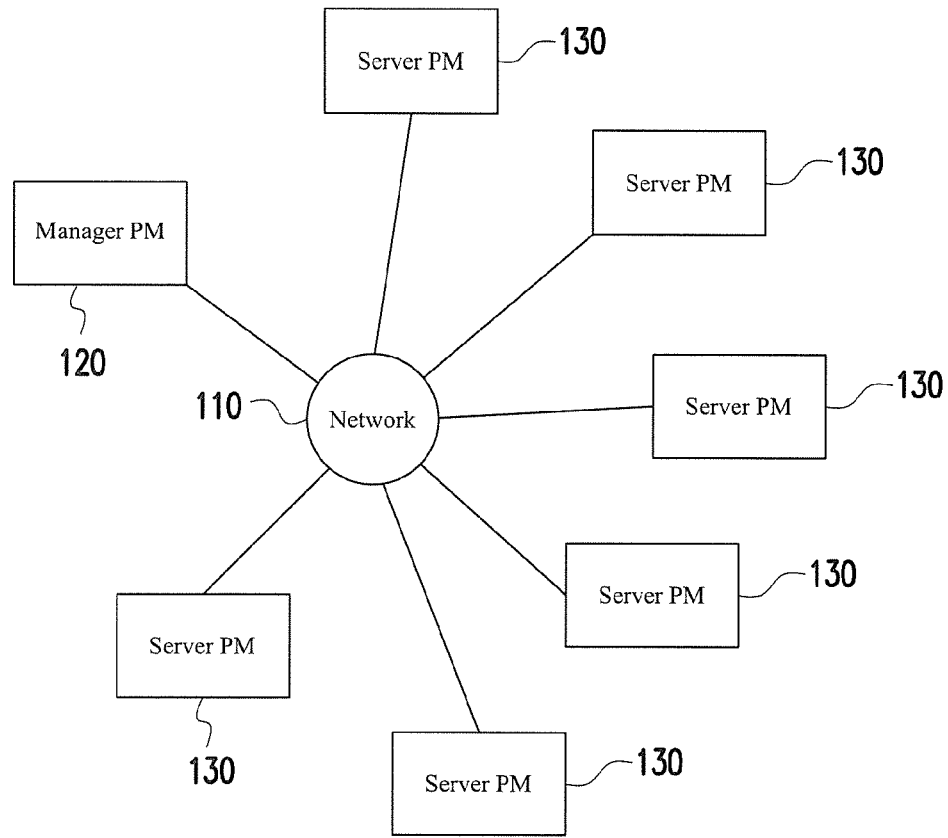
FIG. 1 is a schematic diagram showing a hardware infrastructure of a data center according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram showing a hardware infrastructure of a data center according to an embodiment of the present disclosure. In the infrastructure, a network 110 connects a manager PM 120 and a plurality of server PMs 130. Each server PM 130 may accommodate one or more VMs running on them. Each server PM provides N different resources, such as processor cycles, memory, network bandwidth, etc. N is a preset positive integer. The VMs utilize and consume the resources provided by the PMs. The goals of this embodiment of the present disclosure include consolidating all the VMs onto as few PMs as possible and minimize the time needed to migrate the VMs. Turning off redundant PMs after the VM consolidation helps to reduce the power cost of the data center.

The VM consolidation of this embodiment is in some way similar to a conventional vector bin packing problem. Each server PM 130 may be characterized by an N-dimensional vector. Each element of the vector corresponds to the residual capacity of a particular resource of the server PM. Similarly, each VM may be characterized by an N-dimensional vector. Each element of the vector corresponds to the consumption of a particular resource of the VM. The input to the VM consolidation problem is the vectors representing the server PMs and the VMs and detailed records about the accommodation mapping between the VMs and the server PMs. In order to solve the VM consolidation problem, all the server PMs have to be classified into redundant PMs and surviving PMs and then the VMs running on the redundant PMs have to be migrated to the surviving PMs. For maximum efficiency, the number of redundant PMs to be turned off should be maximized, while the number of VMs migrated and the time required to migrate the VMs should be minimized.

There are many differences between conventional vector bin packing problems and the VM consolidation problem in this embodiment. Firstly, the bins in conventional vector bin packing problems are all empty initially, whereas the server PMs in the VM consolidation problem in this embodiment are partially filled by the VMs already running on them initially. The initial residual capacity of each resource of each surviving PM may be different. Secondly, the VM consolidation in this embodiment takes load balancing into consideration. The final residual capacities of surviving PMs should be as equal to one another as possible. Thirdly, some VMs should not be moved because they are being heavily loaded at the moment and cannot take the performance hit due to migration. The VM consolidation in this embodiment takes such VMs into consideration. Fourthly, the VM consolidation in this embodiment minimizes the total VM migration time by parallelizing the migration sequence.

Figure 2:
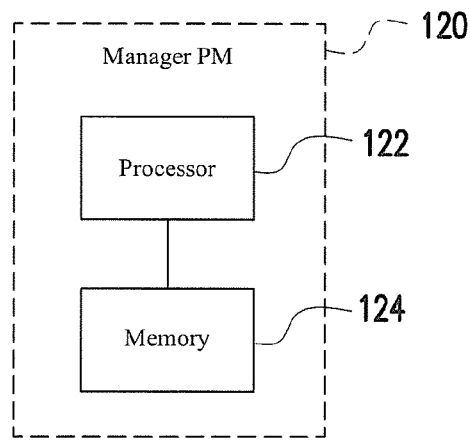
FIG. 2 is a schematic diagram showing a manager PM for VM consolidation according to an embodiment of the present disclosure.

FIG. 2 is a schematic diagram showing the manager PM 120 in FIG. 1. The manager PM 120 includes a memory 124 and a processor 122 coupled to the memory 124. The processor 122 performs each step and each calculation of the method for VM consolidation illustrated in FIG. 3 to FIG. 10. The processor 122 stores the data used by and generated in the steps of the aforementioned method for VM consolidation in the memory 124. For example, the memory 124 may store the aforementioned N-dimensional vectors representing the server PMs and the VMs, the detailed records about the accommodation mapping between the VMs and the server PMs, and the queues, migration paths, graphs and parallel migration sequences generated by the aforementioned method for VM consolidation.

Figure 3:
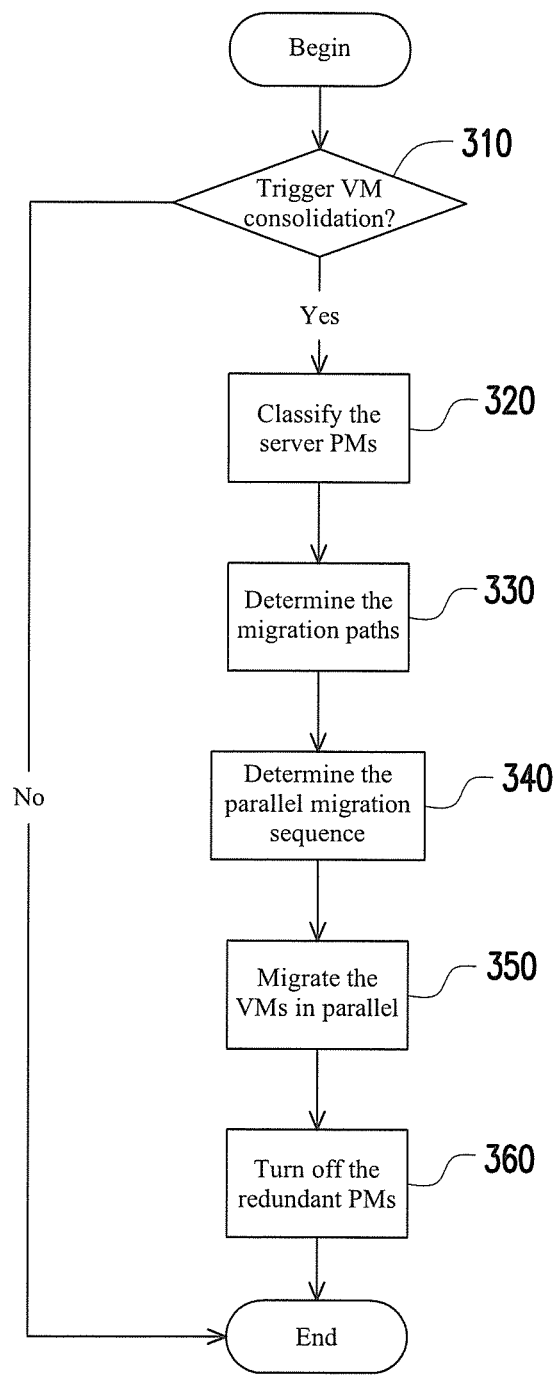
FIG. 3 is a flow chart showing a method for VM consolidation according to an embodiment of the present disclosure.

FIG. 3 is a flow chart of the method for VM consolidation in this embodiment of the present disclosure. First, the manager PM checks whether it is proper to trigger the VM consolidation or not (step 310). If it is not the right moment to trigger the VM consolidation, the flow ends. If it is the right moment to trigger the VM consolidation, the manager PM classifies the server PMs into redundant PMs and surviving PMs so that the surviving PMs can accommodate all the VMs and the redundant PMs are to be turned off (step 320). The manager PM determines the migration paths of the VMs running on the redundant PMs to the surviving PMs according to an interleaved N-dimensional best-fit decreasing packing algorithm and the topology of the network (step 330). The manager PM determines a parallel migration sequence of the VMs running on the redundant PMs based on the migration paths (step 340). The manager PM migrates the VMs running on the redundant PMs to the surviving PMs in parallel according to the parallel migration sequence (step 350). Next, the manager PM turns off the power supply to the redundant PMs to save power and cost (step 360). The details of the aforementioned steps will be discussed later.

In step 310, a series of numbers $(M_1, M_2, \ldots, M_N)$ are calculated for each i, wherein $1 \leq i \leq N$. The number $M_i$ is an estimated amount of the server PMs needed to accommodate the consumption of the i-th resource of all of the VMs according to a one-dimensional best-fit decreasing packing algorithm. For example, if the third one of the resources is memory, then the number $M_3$ is the estimated amount of the server PMs needed to accommodate the total consumption of memory of all VMs according to the one-dimensional best-fit decreasing packing algorithm. Next, calculate the number M, wherein $M=\max\{M_1, M_2, \ldots, M_N\}$. The manager PM triggers the VM consolidation when $M*K<P$, wherein K is a preset constant and P is the number of the server PMs. Since the one-dimensional best-fit decreasing packing algorithm considers only the resource capacities of a single resource of the server PMs and the resource consumptions of a single resource of the VMs, the estimated amounts $M_i$ are somewhat inaccurate. One purpose of the constant K is compensating the estimation error. The other purpose of the constant K is setting a threshold for triggering the VM consolidation.

Figure 4:
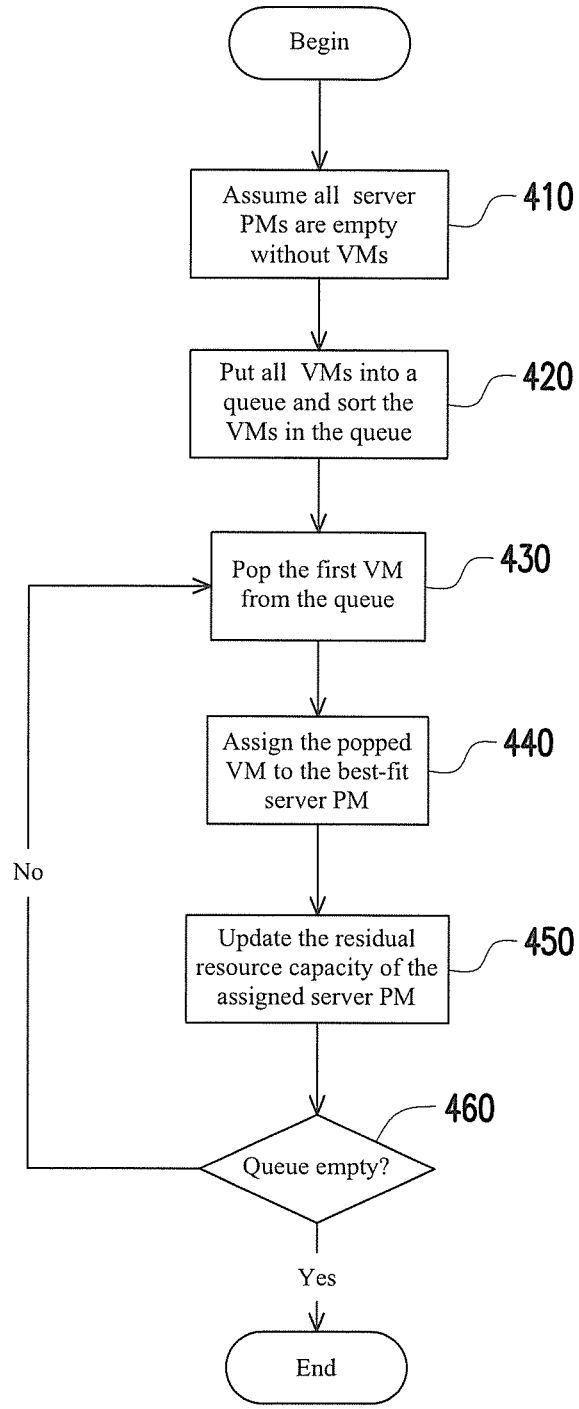
FIG. 4 to FIG. 10 are more detailed flow charts showing a method for VM consolidation according to embodiments of the present disclosure.

FIG. 4 is a flow chart of the aforementioned one-dimensional best-fit decreasing packing algorithm corresponding to $M_i$. First, assume that all of the server PMs are empty without VMs (step 410). Put all of the VMs into a queue and sort the VMs in the queue in decreasing order of the consumption of the i-th resource (step 420). Next, pop the first VM from the queue (step 430). Assign the popped VM to the server PM with the smallest residual capacity of the i-th resource that can accommodate the consumption of the i-th resource of the popped VM (step 440). Only the capacities of the i-th resource of the server PMs and the consumption of the i-th resource of the popped VM are considered in step 440, while the capacities of the other resources and the consumptions of the other resources are simply ignored.

The initial residual capacity of a resource of a server PM is equal to the full capacity of the particular resource of the particular server PM. In this embodiment of the present disclosure, the full capacity of a resource of a server PM is defined to be a preset percentage of the total amount of the particular resource of the particular server PM. The preset percentage is not necessarily 100%. It has been proved by experiment that when the utilization of a resource of a server PM approaches 100%, the power consumption of the server PM increases exponentially. There is an ideal threshold of resource utilization without exponential increase of power consumption for each resource of each server PM, such as 70%, 80% or 90%. The ideal thresholds of the server PMs may be found by experiment. The aforementioned preset percentage for each resource of each server PM is equal to the ideal threshold for the particular resource of the particular server PM.

Next, update the residual capacity of the i-th resource of the assigned server PM by subtracting the consumption of the i-th resource of the popped VM from the residual capacity of the i-th resource of the assigned server PM (step 450). Next, check whether the queue is empty or not (step 460). Return to step 430 if the queue is not empty. The estimated amount $M_i$ is the number of the server PMs used to accommodate all of the VMs in the one-dimensional best-fit decreasing packing algorithm corresponding to the i-th resource illustrated in FIG. 4.

Figure 5:
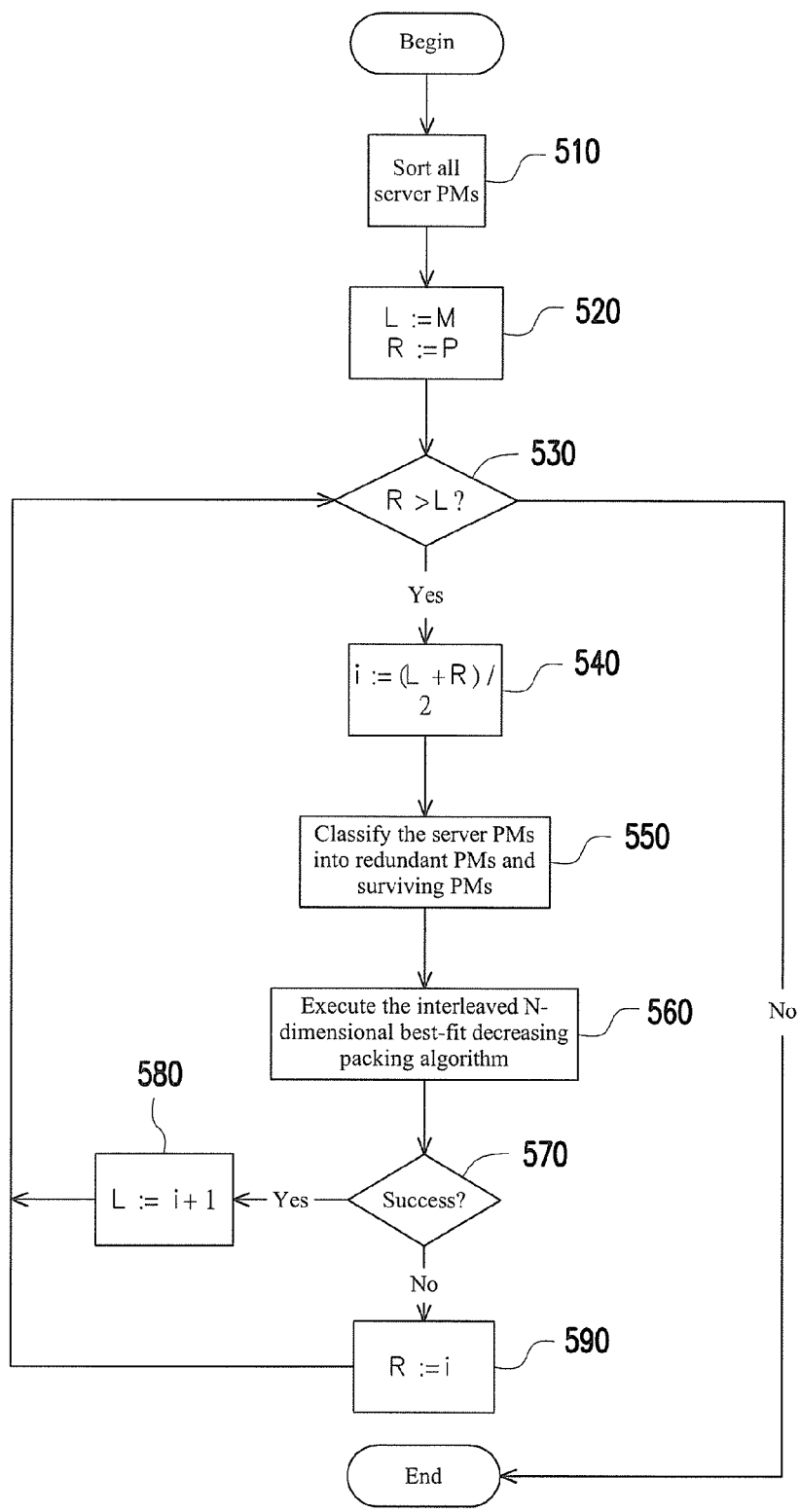

FIG. 5 is a flow chart showing the details of the classification of the server PMs in step 320 in FIG. 3. First, sort all server PMs in order of resource utilization (step 510). The resource utilization of a server PM may be defined in several ways. For example, the resource utilization may be defined to be the maximum among the utilization percentage of each resource of the particular server PM. Alternatively, the resource utilization may be defined to be the sum or average of the utilization percentage of each resource of the particular server PM. When one of the aforementioned definitions of the resource utilization is used, the server PMs have to be sorted in increasing order of resource utilization.

Alternatively, the resource utilization of a server PM may be defined to be the sum of the difference between the aforementioned ideal threshold of each resource of the particular server PM and the utilization percentage of the same resource of the particular server PM. When this definition of the resource utilization is used, the server PMs have to be sorted in decreasing order of resource utilization.

There may be some VMs satisfying a preset "unmovable" condition, such as very busy VMs or heavily loaded VMs. In this case, such VMs should not be migrated and the server PMs with such VMs should be classified as surviving PMs. When there are one or more VMs satisfying the preset condition, the sorting in step 510 becomes a little different as follows. The server PMs with at least one VM satisfying the preset condition are after the server PMs without VMs satisfying the preset condition in the sorted order. The server PMs without VMs satisfying the preset condition are sorted in order of resource utilization as discussed above.

Next, initialize the variables L and R (step 520). A binary search is used to find a dividing point in the sorted server PMs to classify the server PMs into redundant PMs and surviving PMs. The variable L denotes the beginning of the range of the binary search, while the variable R denotes the end of the range of the binary search. The initial value of the variable L is the number M used in step 310 in FIG. 3 and the initial value of the variable R is the number P of the entire server PMs.

Next, check whether the variable R is larger than the variable L or not (step 530). If the variable R is smaller than or equal to the variable L, the flow ends. If the variable R is larger than the variable L, calculate the average i of the variables L and R (step 540). The decimal digits of the average i are removed so that i is an integer and $1<=i<=P$. Next, classify the first i of the sorted server PMs as the redundant PMs and classify the last (P−i) of the sorted server PMs as the surviving PMs (step 550). Execute the interleaved N-dimensional best-fit decreasing packing algorithm to see whether the VMs running on the redundant PMs can migrate to the surviving PMs successfully or not (step 560) and then checks the result returned by the interleaved N-dimensional best-fit decreasing packing algorithm (step 570). If the returned result is success, set the variable L to be i+1 (step 580) and return to step 530. If the returned result is failure, set the variable R to be i (step 590) and return to step 530.

The binary search in the loop of steps 530-590 is designed to find the largest i such that the VMs running on the redundant PMs can migrate to the surviving PMs successfully according to the interleaved N-dimensional best-fit decreasing packing algorithm. The final classification of the redundant PMs and the surviving PMs is according to the last iteration of step 550. The migration paths in step 330 in FIG. 3 are determined by the last successful execution of the interleaved N-dimensional best-fit decreasing packing algorithm in the loop of steps 530-590.

Figure 6:
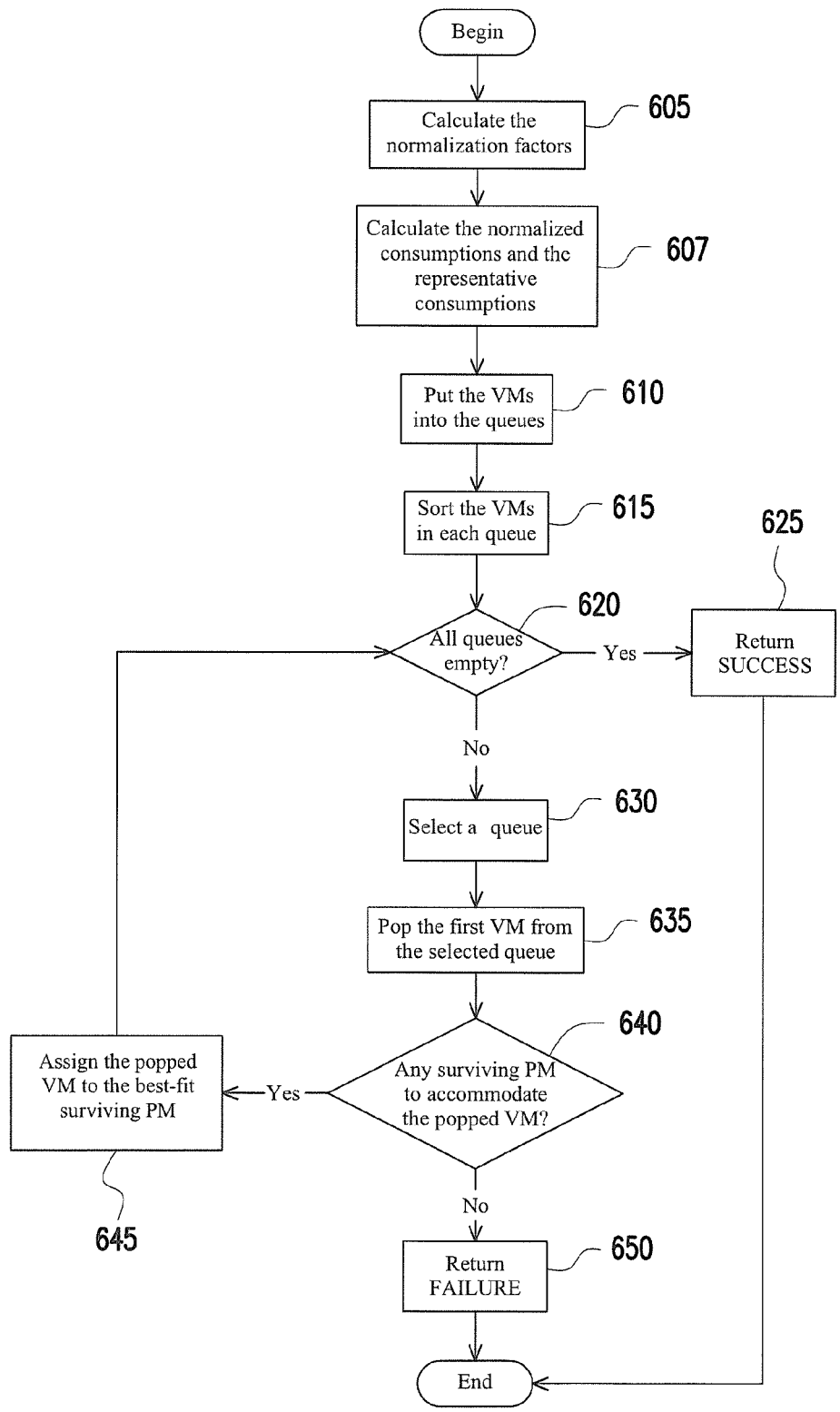

FIG. 6 is a flow chart of the interleaved N-dimensional best-fit decreasing packing algorithm executed in step 560 in FIG. 5. First, calculate the normalization factor corresponding to each of the resources based on the consumptions of the resources of all of the VMs (step 605). The normalization factor corresponding to the i-th resource is calculated by subtracting the sum of the consumptions of the i-th resource of all of the VMs from the sum of capacities of the i-th resource of all of the surviving PMs, and then dividing the result of the subtraction by the number of the surviving PMs, wherein i is an integer and $1<=i<=N$.

Next, calculate normalized consumptions of the resources of each VM running on the redundant PMs and representative consumptions of each VM running on the redundant PMs based on the normalization factors (step 607). For any VM running on a redundant PM, the normalized consumption of the i-th resources of the particular VM is calculated by dividing the consumption of the i-th resource of the particular VM by the normalization factor corresponding to the i-th resource. For example, if the N-dimensional vector of resource consumptions of a VM is $(v_1, v_2, \ldots, v_N)$, then the normalized consumptions of the resources of the particular VM is $(v_1/n_1, v_2/n_2, \ldots, v_N/n_N)$, wherein $n_i$ is the normalization factor corresponding to the i-th resource, $1<=i<=N$. The representative consumption of each VM running on the redundant PMs is the largest normalized consumption among the normalized consumptions of the resources of the particular VM. For example, if the normalized consumption $v_3/n_3$ is the largest in the N-dimensional vector of normalized consumptions $(v_1/n_1, v_2/n_2, \ldots, v_N/n_N)$ of a VM, then the normalized consumption $v_3/n_3$ is the representative consumption of this particular VM. The representative consumption represents the overall resource consumption of a VM.

Next, put each of the VMs running on the redundant PMs into one or more queues according to the normalized consumptions of the resources of each of the VMs (step 610). There are N queues in total and there is a one-to-one mapping relationship between the N queues and the N resources. Each of the VMs running on the redundant PMs is put into the queue corresponding to the resource corresponding to the representative consumption of the particular VM. For example, if the representative consumption of a VM is the normalized consumption of the second resource of the particular VM, then the particular VM is put into the second queue corresponding to the second one of the N resources. Each VM is put into only one queue.

Next, sort the VMs in each of the queues in decreasing order of the representative consumptions (step 615). In other words, the VMs in the i-th queue are sorted in decreasing order of the normalized consumption $v_i/n_i$ corresponding to the i-th resource.

Next, check all of the queues to see if all of the queues are empty (step 620). If all of the queues are empty, the packing of the VMs running on the redundant PMs into the surviving PMs is successful and a result of success is returned (step 625). Otherwise, select a queue from the queues according to normalized sums of residual capacities corresponding to the resources (step 630).

In order to select a queue from the queues, the processor of the manager PM calculates a normalized sum of residual capacities corresponding to each of the resources by dividing the sum of the residual capacities of the particular resource of the surviving PMs by the normalization factor corresponding to the particular resource. For example, the normalized sum of residual capacity corresponding to the i-th resource is calculated by dividing the sum of the residual capacities of the i-th resource of the surviving PMs by the normalization factor $n_i$ corresponding to the i-th resource. The processor of the manager PM defines a set including all of the queues except the queue corresponding to the resource corresponding to the smallest normalized sum of residual capacities. The processor of the manager PM selects the queue in the set whose first VM has the largest representative consumption among the representative consumptions of the first VMs of the queues in the set.

Next, pop the first VM from the selected queue (step 635). The aforementioned selection criterion guarantees that the selected queue is non-empty. The aforementioned interleaved selection of the queues ensures that the packing of the VMs into the surviving PMs is balanced. Next, check to see if there is any surviving PM that can accommodate the consumptions of all of the resources of the popped VM (step 640). If there is no surviving PM that can accommodate the consumptions of all of the resources of the popped VM, return a result of failure (step 650). Otherwise, assign the popped VM to the surviving PM with the smallest representative residual capacity that can accommodate the consumptions of all of the resources of the popped VM (step 645) and return to step 620.

In order to assign the popped VM, the processor of the manager PM has to calculate the representative residual capacity of each surviving PM. The representative residual capacity of each surviving PM is the minimum of the normalized residual capacities of the resources of the particular PM. The normalized residual capacity of each of the resources of the particular PM is calculated by dividing the residual capacity of the particular resource of the particular PM by the normalization factor corresponding to the particular resource. For example, if the N-dimensional vector of residual capacities of the resources of a surviving PM is $(p_1, p_2, \ldots, p_N)$, then the normalized residual capacities of the resources of the particular PM is $(p_1/n_1, p_2/n_2, \ldots, p_N/n_N)$, wherein $n_i$ is the normalization factor corresponding to the i-th resource, $1<=i<=N$. The representative residual capacity of the particular PM is the minimum of the normalized residual capacities $(p_1/n_1, p_2/n_2, \ldots, p_N/n_N)$. The VM popped in step 635 is assigned to the surviving PM with the smallest representative residual capacity that can accommodate the consumptions of all of the resources of the popped VM. This best-fit policy helps to balance the loads of the VMs on the surviving PMs. The processor of the manager PM updates the residual capacities of the resources of the assigned PM by subtracting the consumptions of the resources of the popped VM from the residual capacities of the resources of the assigned PM.

The interleaved N-dimensional best-fit decreasing packing algorithm illustrated in FIG. 6 has two alternatives of implementation. The first alternative is already discussed above. The second alternative is described below.

The second alternative differs from the first alternative in steps 610, 630 and 635. In step 610, there are N*(N−1) queues in total. Each queue is corresponding to a different permutation of two of the N resources. For example, when N=3 and the resources are processor cycles, memory and network bandwidth, there are six different permutations of two of the three resources, namely, {processor, memory}, {processor, network}, {memory, processor}, {memory, network}, {network, processor} and {network, memory}. There are six queues in the aforementioned example and there is a one-to-one mapping relationship between the six queues and the six permutations. A VM running on a redundant PM is put into the queue corresponding to the permutation of the i-th resource followed by the j-th resource as long as the normalized consumption of the i-th resource of the particular VM is larger than the normalized consumption of the j-th resource of the particular VM, wherein i and j are both integers, $1<=i<=N$, $1<=j<=N$, and i is not equal to j. For example, if the normalized consumption of network bandwidth of a VM is larger than the normalized consumption of memory of the VM, the VM is put into the queue corresponding to the permutation {network, memory}. A VM may be put into multiple queues in the second alternative because the VM may satisfy the criteria of several queues at the same time.

In step 630, the processor of the manager PM selects the queue corresponding to the permutation of the resource corresponding to the largest normalized sum of residual capacities followed by the resource corresponding to the smallest normalized sum of residual capacities. For example, among the normalized sums of residual capacities of each resource, if the normalized sum of residual capacities of processor cycles is the largest and the normalized sum of residual capacities of network bandwidth is the smallest, then the processor of the manager PM selects the queue corresponding to the permutation {processor, network}. The interleaved selection of the queues in the second alternative also guarantees that the selected queue is non-empty.

In step 635, in addition to popping the first VM from the selected queue, the processor of the manager PM removes the popped VM from all of the queues because the popped VM may be present in the other queues as well.

The other steps in FIG. 6 are the same in both the first alternative and the second alternative.

The migration paths of the VMs running on the redundant PMs to the surviving PMs are determined by the last successful iteration of the interleaved N-dimensional best-fit decreasing packing algorithm executed in step 560 in FIG. 5. Each migration path corresponds to one of the VMs running on the redundant PMs. The source of each migration path is the redundant PM on which the corresponding VM is running and the destination of the particular migration path is the surviving PM corresponding to the corresponding VM assigned by the last successful iteration of the interleaved N-dimensional best-fit decreasing packing algorithm. The rest of each migration path is determined according to the topology of the network. For example, the rest of each migration path may pass through routing elements of the network such as switches and routers, even through other PMs connected by the network.

Figure 7:
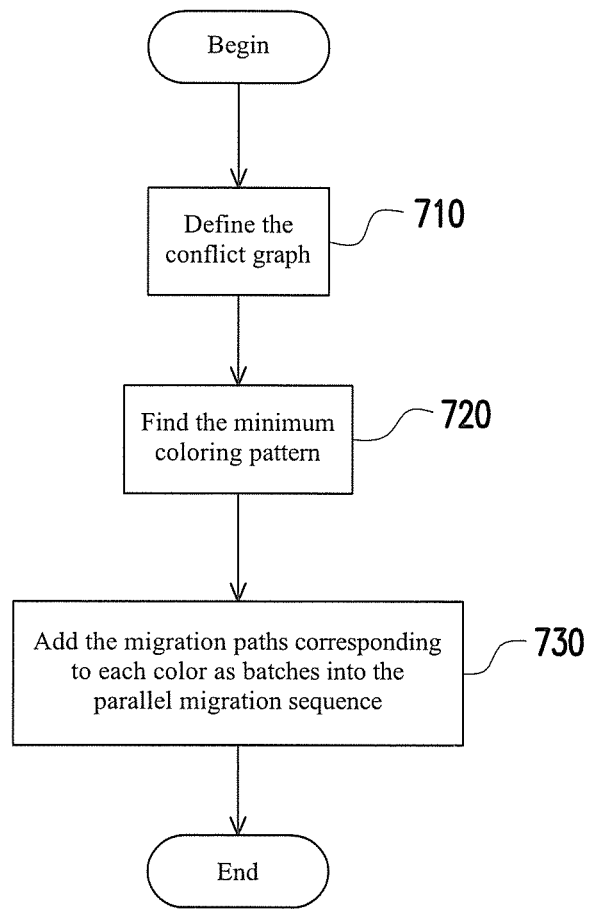

FIG. 7 is a flow chart of the determination of the parallel migration sequence in step 340 in FIG. 3 according to an embodiment of the present disclosure. First, define a conflict graph (step 710). Each node of the conflict graph represents one of the migration paths. Each node of the conflict graph has a weight representing the estimated time needed to migrate the VM corresponding to the particular node to the corresponding surviving PM. Since most of the time needed to migrate a VM is spent on transmitting the contents of the memory of the VM, the time needed to migrate the VM can be estimated based on the memory consumption of the VM and the network bandwidth of the migration path. There is an edge between two nodes of the conflict graph if the two migration paths corresponding to the two nodes overlap in any part in the network. An edge in the conflict graph means that the two VMs corresponding to the two nodes at the ends of the edge cannot be migrated in parallel because of the overlapping part of their migration paths.

Next, use a maximum vertex-coloring algorithm on the conflict graph to find a coloring pattern of the nodes such that the sum of the weights of the colors of the coloring pattern is minimum (step 720). The weight of each of the colors is defined to be the maximum of the weights of the nodes of the particular color. For example, if some nodes in the conflict graph are painted yellow by the maximum vertex-coloring algorithm, then the weight of yellow is the maximum of the weights of the yellow nodes. Since two nodes at the ends of the same edge are always painted in different colors by the maximum vertex-coloring algorithm, VMs corresponding to nodes of the same color can be migrated in parallel because there is no conflict among their migration paths.

Next, add the migration paths corresponding to the nodes of each of the colors as a batch of migration paths into the parallel migration sequence (step 730). In other words, the migration paths corresponding to nodes of the same color are added as a batch of migration paths into the parallel migration sequence. The migration paths corresponding to nodes of another color are added as another batch of migration paths into the parallel migration sequence, and so on.

The flow in FIG. 7 can be used to determine a parallel migration sequence with minimum migration time. However, the computational complexity of step 720 is NP-hard. A data center may have thousands of VMs to migrate and step 720 may take too much time in this case. In order to speed up the determination of the parallel migration sequence, the problem formulation must be simplified.

Figure 8:
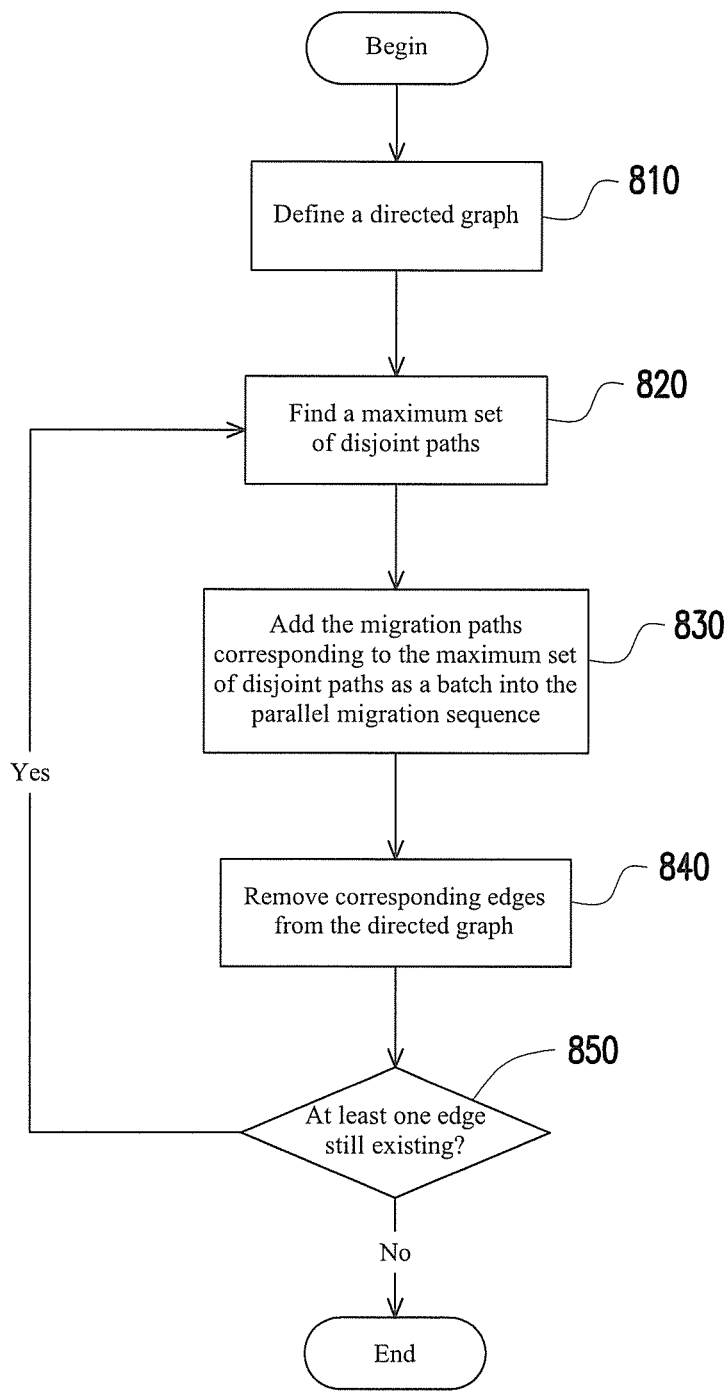

FIG. 8 is a flow chart of the determination of the parallel migration sequence in step 340 in FIG. 3 according to another embodiment of the present disclosure. The problem formulation in this embodiment is simplified by assuming that the time needed to migrate each VM is the same. First, define a directed graph according to the migration paths and the topology of the network (step 810). The nodes of the directed graph include the redundant PMs and the surviving PMs, and the routing elements of the network such as switches and routers if necessary. The migration paths define the edges of the directed graph.

Next, finding a maximum set of disjoint paths in the directed graph (step 820). This is a conventional problem in algorithmic graph theory and there are many conventional algorithms that can be used to find a maximum set of disjoint paths in the directed graph. Each maximum set of disjoint paths corresponds to a set of VMs that can be migrated in parallel. Next, add the migration paths corresponding to the maximum set of disjoint paths as a batch of migration paths into the parallel migration sequence (step 830). Remove the edges corresponding to the maximum set of disjoint paths from the directed graph (step 840). Check to see whether there is at least one edge still existing in the directed graph or not (step 850). Return to step 820 if there is at least one edge still existing in the directed graph.

Figure 9:
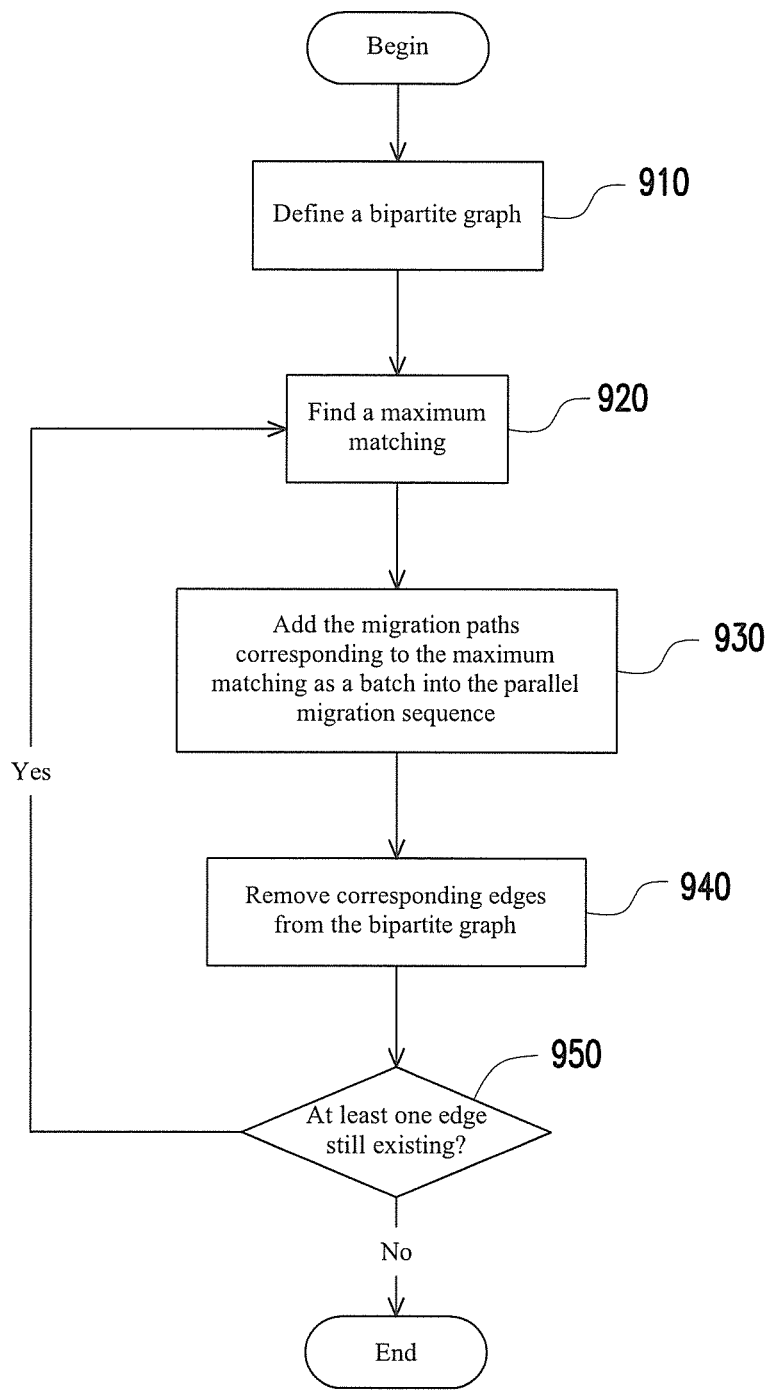

FIG. 9 is a flow chart of the determination of the parallel migration sequence in step 340 in FIG. 3 according to another embodiment of the present disclosure. The problem formulation in this embodiment is further simplified by assuming that the time needed to migrate each VM is the same and two migration paths do not overlap as long as their sources PMs are different and their destinations PMs are also different. The simplification above is applicable to some simple networks, such as multiple server PMs connected by a single switch. First, define a bipartite graph according to the migration paths (step 910). The nodes of the bipartite graph are the redundant PMs and the surviving PMs. There is an edge between a redundant PM and a surviving PM if there is a migration path from the particular redundant PM to the particular surviving PM.

Next, find a maximum matching in the bipartite graph (step 920). This is also a conventional problem in algorithmic graph theory and there are many conventional algorithms that can be used to find a maximum matching in the bipartite graph. Each maximum matching corresponds to a set of VMs that can be migrated in parallel. Next, add the migration paths corresponding to the maximum matching as a batch of migration paths into the parallel migration sequence (step 930). Remove the edges corresponding to the maximum matching from the bipartite graph (step 940). Check to see whether there is at least one edge still existing in the bipartite graph or not (step 950). Return to step 920 if there is at least one edge still existing in the bipartite graph.

Figure 10:
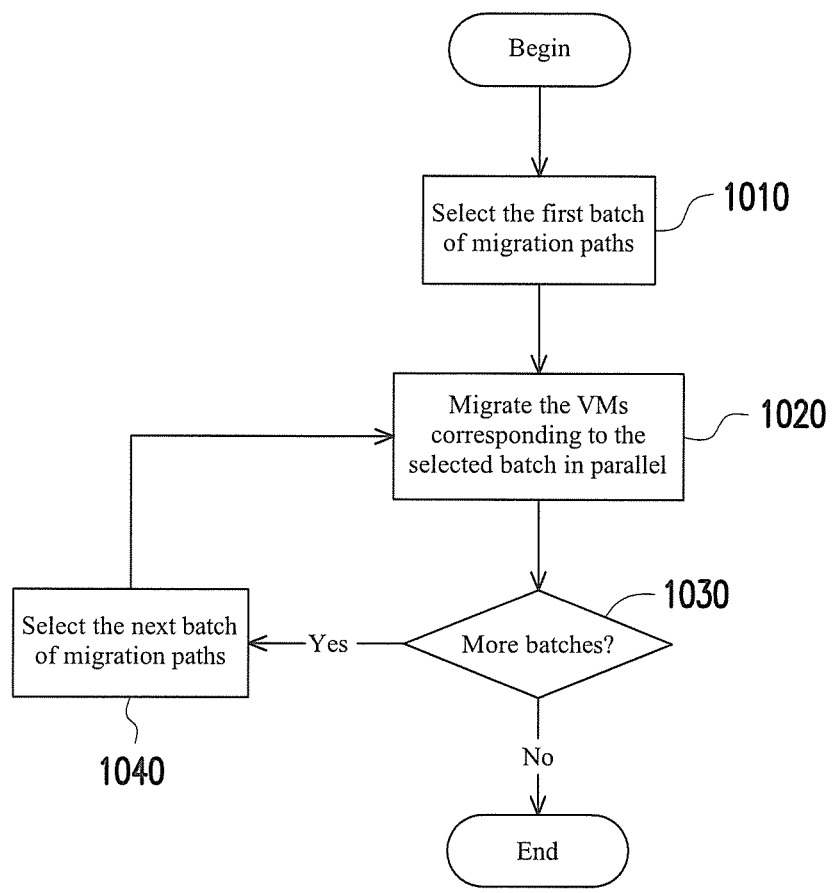

FIG. 10 is a flow chart showing the parallel migration in step 350 in FIG. 3 according to an embodiment of the present disclosure. The parallel migration may be based on the parallel migration sequence determined in the flow in FIG. 7, FIG. 8 or FIG. 9. As discussed above, the parallel migration sequence includes one or more batches of migration paths. First, select the first batch of migration paths in the parallel migration sequence (step 1010). Migrate the VMs corresponding to the selected batch to the surviving PMs in parallel according to the migration paths of the selected batch (step 1020). Next, check to see whether or not there is at least one batch of migration paths after the selected batch (step 1030). If there is at least one batch of migration paths after the selected batch, select the next batch of migration paths in the parallel migration sequence and return to step 1020 (step 1040).

Figure 11A:
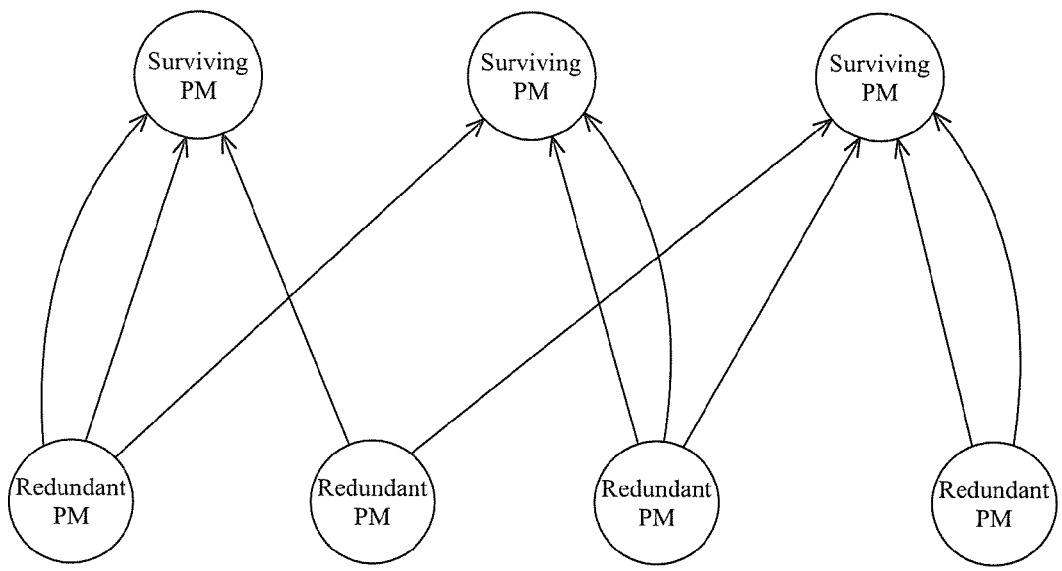
FIG. 11A to FIG. 11H are schematic diagrams showing an example of the generation of the parallel migration sequence according to an embodiment of the present disclosure.
Figure 11B:
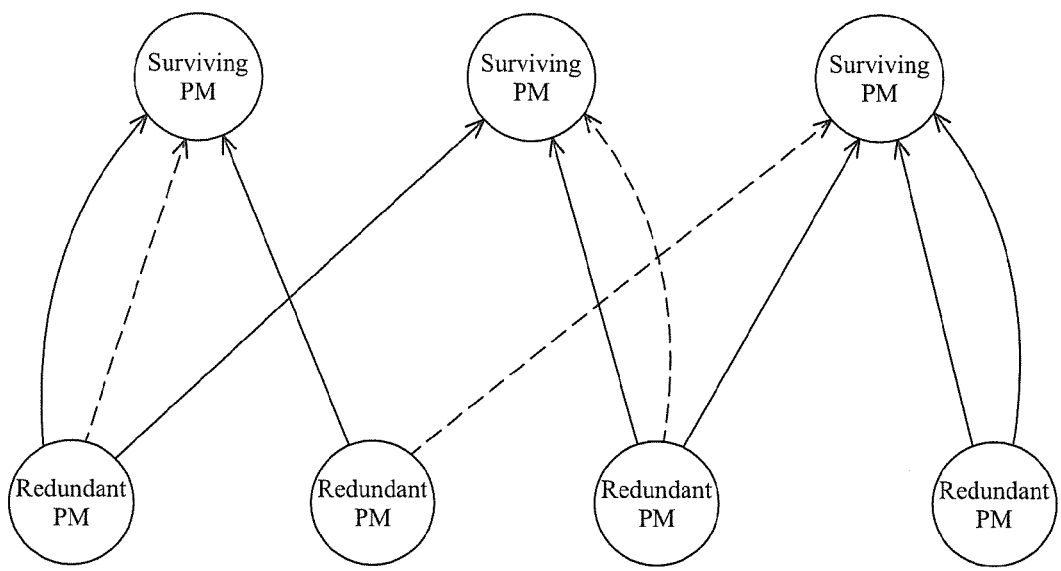
Figure 11C:
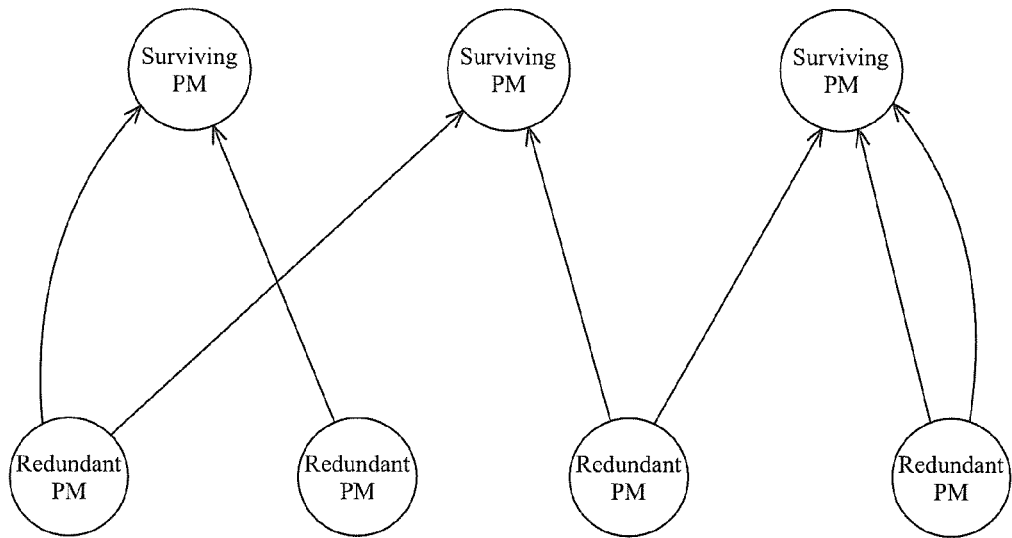
Figure 11D:
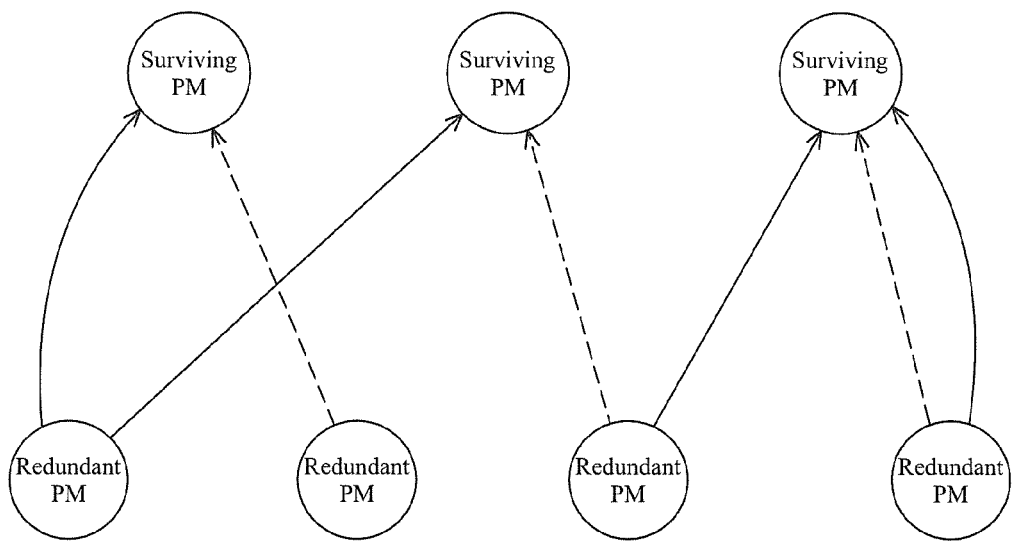
Figure 11E:
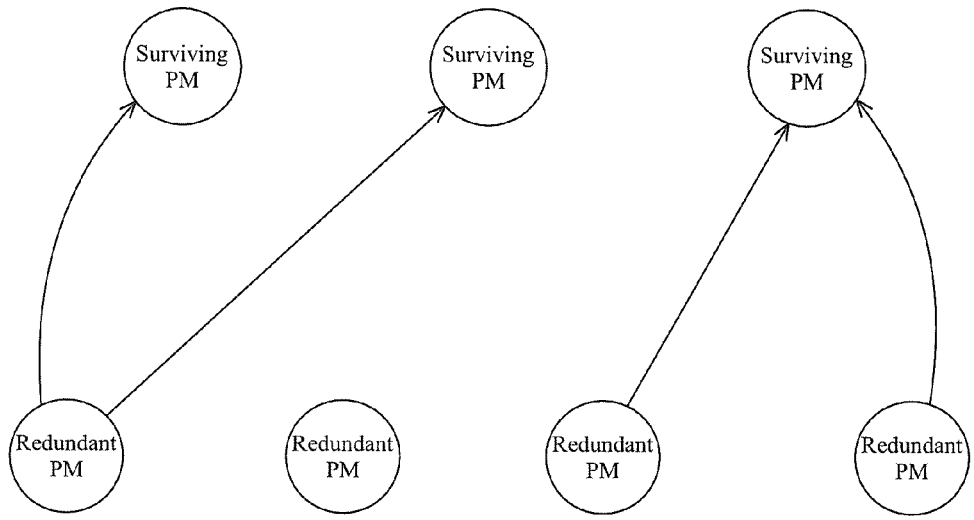
Figure 11F:
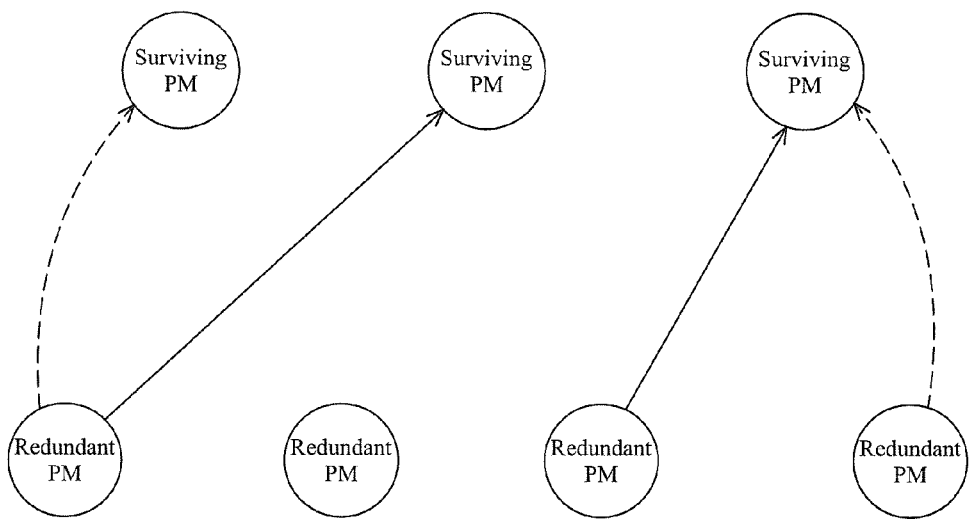
Figure 11G:
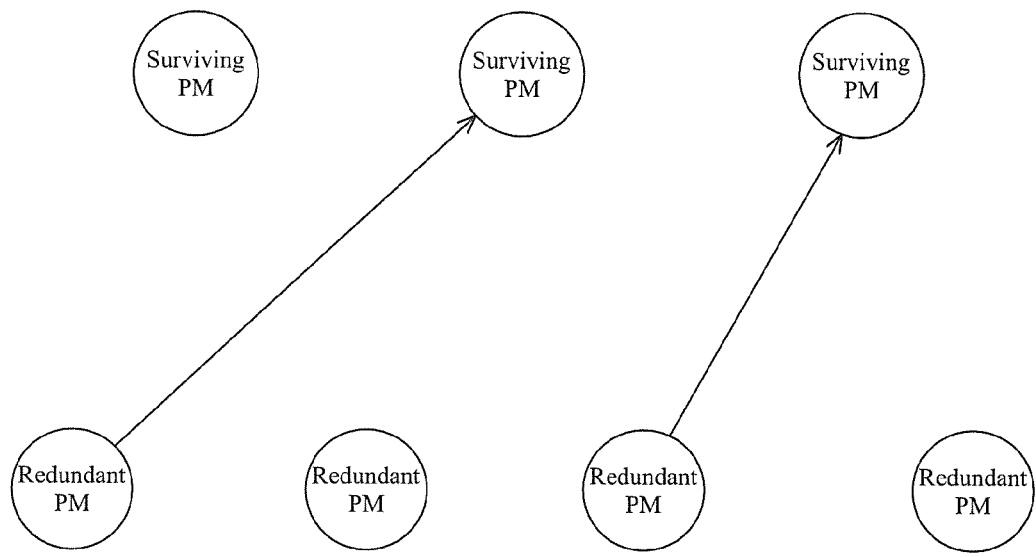
Figure 11H:
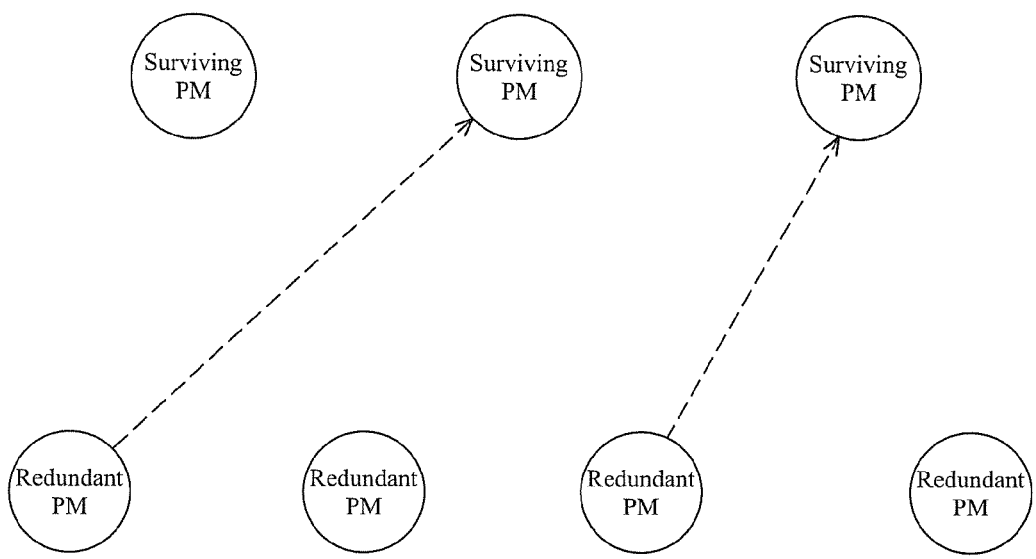

FIG. 11A to FIG. 11H illustrate an example of determining a parallel migration sequence according to the flow shown in FIG. 9. As shown in FIG. 11A, this example includes four redundant PMs, three surviving PMs, and ten VMs to be migrated. Each of the ten edges of the bipartite graph is corresponding to a migration path. First, the migration paths corresponding to the three dotted edges shown in FIG. 11B are added as the first batch of migration paths into the parallel migration sequence. Next, the three dotted edges are removed, as shown in FIG. 11C. Next, the migration paths corresponding to the three dotted edges shown in FIG. 11D are added as the second batch of migration paths into the parallel migration sequence. The three dotted edges are removed as shown in FIG. 11E. Next, the migration paths corresponding to the two dotted edges shown in FIG. 11F are added as the third batch of migration paths into the parallel migration sequence. The two dotted edges are removed as shown in FIG. 11G. Finally, the migration paths corresponding to the last two dotted edges shown in FIG. 11H are added as the fourth batch of migration paths into the parallel migration sequence.

In summary, the method and the manager PM for VM consolidation provided in the embodiments above try to maximize the number of redundant PMs to be turned off without degrading the performance of individual VMs. The method and the manager PM try to minimize the time required to complete all the VM migrations by parallelizing the migration sequence. The method and the manager PM use binary search to find the optimal number of surviving PMs. The method and the manager PM classify server PMs with light load as redundant PMs in order to minimize the number of VMs to be migrated. Moreover, the method and the manager PM pack VMs into surviving PMs in an interleaved best-fit decreasing fashion to improve the result of consolidation, such as load balancing.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for virtual machine (VM) consolidation, performed by a manager physical machine (PM), wherein a network connects the manager PM and a plurality of server PMs, a plurality of VMs is running on the server PMs, the server PMs provide N resources and the VMs consume the resources, N is a preset positive integer, the method comprises:

the manager PM classifying the server PMs into redundant PMs and surviving PMs, wherein the VMs running on the redundant PMs can migrate to the surviving PMs successfully according to an interleaved N-dimensional best-fit decreasing packing algorithm;

the manager PM determining migration paths of the VMs running on the redundant PMs to the surviving PMs according to the interleaved N-dimensional best-fit decreasing packing algorithm and a topology of the network;

the manager PM determining a parallel migration sequence of the VMs running on the redundant PMs based on the migration paths; and the manager PM migrating the VMs running on the redundant PMs to the surviving PMs in parallel according to the parallel migration sequence.

2. The method of claim 1, further comprising:

estimating an amount $M_i$ of the server PMs needed to accommodate a consumption of the i-th resource of all of the VMs according to a one-dimensional best-fit decreasing packing algorithm for each i, wherein 1<=i<=N; and triggering the VM consolidation when M*K<P, wherein M is a maximum value among all $M_i$, K is a preset constant and P is a number of the server PMs.

3. The method of claim 2, wherein the one-dimensional best-fit decreasing packing algorithm corresponding to $M_i$ comprises:

assuming all of the server PMs are empty without VMs;

putting all of the VMs into a queue and sorting the VMs in the queue in decreasing order of the consumption of the i-th resource;

popping the first VM from the queue;

assigning the popped VM to the server PM with the smallest residual capacity of the i-th resource that can accommodate the consumption of the i-th resource of the popped VM;

updating the residual capacity of the i-th resource of the assigned server PM by subtracting the consumption of the i-th resource of the popped VM from the residual capacity of the i-th resource of the assigned server PM; and returning to the popping step if the queue is not empty, wherein $M_i$ is a number of the server PMs used to accommodate all of the VMs in the one-dimensional best-fit decreasing packing algorithm.

4. The method of claim 1, wherein the step of classifying the server PMs comprises:

sorting all of the server PMs in order of resource utilization;

classifying the first i of the sorted server PMs as the redundant PMs and classifying the last (P–i) of the sorted server PMs as the surviving PMs, wherein i is an integer and 1<=i<=P, P is a number of all of the server PMs; and finding the largest i such that the VMs running on the redundant PMs can migrate to the surviving PMs successfully according to the interleaved N-dimensional best-fit decreasing packing algorithm.

5. The method of claim 1, wherein the step of classifying the server PMs comprises:

sorting all of the server PMs, wherein the server PMs with at least one VM satisfying a preset condition are after the server PMs without VMs satisfying the preset condition in the sorted order and the server PMs without VMs satisfying the preset condition are sorted in order of resource utilization;

classifying the first i of the sorted server PMs as the redundant PMs and classifying the last (P–i) of the sorted server PMs as the surviving PMs, wherein i is an integer and 1<=i<=P, P is a number of all of the server PMs; and finding the largest i such that the VMs running on the redundant PMs can migrate to the surviving PMs successfully according to the interleaved N-dimensional best-fit decreasing packing algorithm.

6. The method of claim 1, wherein the interleaved N-dimensional best-fit decreasing packing algorithm comprises:

calculating a normalization factor corresponding to each of the resources based on consumptions of the resources of all of the VMs;

calculating normalized consumptions of the resources of each of the VMs running on the redundant PMs and representative consumptions of each of the VMs running on the redundant PMs based on the normalization factors;

putting each of the VMs running on the redundant PMs into one or more queues according to the normalized consumptions of the resources of each of the VMs;

sorting the VMs in each of the queues in decreasing order of the representative consumptions;

checking all of the queues and returning a result of success if all of the queues are empty;

selecting a queue from the queues according to normalized sums of residual capacities corresponding to the resources;

popping the first VM from the selected queue;

assigning the popped VM to the surviving PM with a smallest representative residual capacity that can accommodate the consumptions of all of the resources of the popped VM;

returning a result of failure if there is no surviving PM that can accommodate the consumptions of all of the resources of the popped VM; and returning to the step of checking all of the queues.

7. The method of claim 6, wherein the normalization factor corresponding to the i-th resource is calculated by subtracting a sum of the consumptions of the i-th resource of all of the VMs from a sum of capacities of the i-th resource of all of the surviving PMs, and then dividing the result of the subtraction by a number of the surviving PMs, wherein i is an integer and 1<=i<=N;

the normalized consumption of the i-th resource of each of the VMs running on the redundant PMs is calculated by dividing the consumption of the i-th resource of the particular VM by the normalization factor corresponding to the i-th resource;

the representative consumption of each of the VMs running on the redundant PMs is a largest normalized consumption among the normalized consumptions of the resources of the particular VM;

the normalized sum of residual capacities corresponding to the i-th resource is calculated by dividing a sum of the residual capacities of the i-th resource of the surviving PMs by the normalization factor corresponding to the i-th resource.

8. The method of claim 7, wherein there are N queues in total, there is a one-to-one mapping relationship between the N queues and the N resources, and the step of putting the VMs running on the redundant PMs into the queues comprises:

putting each of the VMs running on the redundant PMs into the queue corresponding to the resource corresponding to the representative consumption of the particular VM; and the step of selecting a queue from the queues comprises:

defining a set comprising all of the queues except the queue corresponding to the resource corresponding to the smallest normalized sum of residual capacities; and selecting the queue in the set whose first VM has the largest representative consumption among the representative consumptions of the first VMs of the queues in the set.

9. The method of claim 7, wherein there are $N*(N-1)$ queues in total, each of the queues is corresponding to a different permutation of two of the N resources, and the step of putting the VMs running on the redundant PMs into the queues comprises:

putting each one of the VMs running on the redundant PMs into the queue corresponding to the permutation of the i-th resource followed by the j-th resource when the normalized consumption of the i-th resource of the particular VM is larger than the normalized consumption of the j-th resource of the particular VM, wherein j is an integer, $1<=j<=N$ and j is not equal to i;

and the step of selecting a queue from the queues comprises:

selecting the queue corresponding to the permutation of the resource corresponding to the largest normalized sum of residual capacities followed by the resource corresponding to the smallest normalized sum of residual capacities;

and the step of popping the first VM from the selected queue comprises:

removing the popped VM from all of the queues.

10. The method of claim 6, wherein the step of assigning the popped VM comprises:

calculating the representative residual capacity of each of the surviving PMs, wherein the representative residual capacity of each of the surviving PMs is a minimum of normalized residual capacities of the resources of the particular PM, the normalized residual capacity of each of the resources of the particular PM is calculated by dividing the residual capacity of the particular resource of the particular PM by the normalization factor corresponding to the particular resource;

assigning the popped VM to the surviving PM with the smallest representative residual capacity that can accommodate the consumptions of all of the resources of the popped VM; and updating the residual capacities of the resources of the assigned PM by subtracting the consumptions of the resources of the popped VM from the residual capacities of the resources of the assigned PM.

11. The method of claim 1, wherein each of the migration paths corresponds to one of the VMs running on the redundant PMs, the source of the particular migration path is the redundant PM on which the particular VM is running and the destination of the particular migration path is the surviving PM corresponding to the particular VM assigned by the interleaved N-dimensional best-fit decreasing packing algorithm, the rest of the particular migration path is determined according to the topology of the network.

12. The method of claim 11, wherein the step of determining the parallel migration sequence comprises:

defining a conflict graph, wherein each node of the conflict graph represents one of the migration paths, each of the nodes has a weight representing an estimated time needed to migrate the VM corresponding to the particular node to the corresponding surviving PM, there is an edge between two nodes of the conflict graph if the two migration paths corresponding to the two nodes overlap in any part;

using a maximum vertex-coloring algorithm on the conflict graph to find a coloring pattern of the nodes such that a sum of weights of colors of the coloring pattern is minimum, wherein the weight of each of the colors is a maximum of the weights of the nodes of the particular color; and adding the migration paths corresponding to the nodes of each of the colors as a batch of migration paths into the parallel migration sequence.

13. The method of claim 11, wherein the step of determining the parallel migration sequence comprises:

defining a directed graph according to the migration paths and the topology of the network;

finding a maximum set of disjoint paths in the directed graph and adding the migration paths corresponding to the maximum set of disjoint paths as a batch of migration paths into the parallel migration sequence;

removing edges corresponding to the maximum set of disjoint paths from the directed graph; and returning to the step of finding a maximum set of disjoint paths if there is at least one edge still existing in the directed graph.

14. The method of claim 11, wherein the step of determining the parallel migration sequence comprises:

defining a bipartite graph according to the migration paths;

finding a maximum matching in the bipartite graph and adding the migration paths corresponding to the maximum matching as a batch of migration paths into the parallel migration sequence;

removing edges corresponding to the maximum matching from the bipartite graph; and returning to the step of finding a maximum matching if there is at least one edge still existing in the bipartite graph.

15. The method of claim 1, wherein the step of migrating the VMs running on the redundant PMs comprises:

selecting a first batch of migration paths in the parallel migration sequence;

migrating the VMs corresponding to the selected batch to the surviving PMs in parallel according to the migration paths of the selected batch; and if there is at least one batch of migration paths after the selected batch, selecting a next batch of migration paths in the parallel migration sequence and returning to the step of migrating the VMs corresponding to the selected batch.

16. A manager physical machine (PM) for virtual machine (VM) consolidation, wherein a network connects the manager PM and a plurality of server PMs, a plurality of VMs is running on the server PMs, the server PMs provide N resources and the VMs consume the resources, N is a preset positive integer, the manager PM comprises a memory and a processor coupled to the memory, wherein the processor classifies the server PMs into redundant PMs and surviving PMs, wherein the VMs running on the redundant PMs can migrate to the surviving PMs successfully according to an interleaved N-dimensional best-fit decreasing packing algorithm;

the processor determines migration paths of the VMs running on the redundant PMs to the surviving PMs according to the interleaved N-dimensional best-fit decreasing packing algorithm and a topology of the network; the processor stores the migration paths in the memory;

the processor determines a parallel migration sequence of the VMs running on the redundant PMs based on the migration paths and stores the parallel migration sequence in the memory;

the processor migrates the VMs running on the redundant PMs to the surviving PMs in parallel according to the parallel migration sequence.

17. The manager PM of claim 16, wherein the processor estimates an amount $M_i$ of the server PMs needed to accommodate a consumption of the i-th resource of all of the VMs according to a one-dimensional best-fit decreasing packing algorithm for each i, $1<=i<=N$; the processor triggers the VM consolidation when $M*K<P$, M is a maximum value among all $M_i$, K is a preset constant and P is a number of the server PMs.

18. The manager PM of claim 17, wherein the one-dimensional best-fit decreasing packing algorithm corresponding to $M_i$ comprises:
assuming all of the server PMs are empty without VMs;
putting all of the VMs into a queue and sorting the VMs in the queue in decreasing order of the consumption of the i-th resource;
popping the first VM from the queue;
assigning the popped VM to the server PM with the smallest residual capacity of the i-th resource that can accommodate the consumption of the i-th resource of the popped VM;
updating the residual capacity of the i-th resource of the assigned server PM by subtracting the consumption of the i-th resource of the popped VM from the residual capacity of the i-th resource of the assigned server PM; and
returning to the popping step if the queue is not empty, wherein $M_i$ is a number of the server PMs used to accommodate all of the VMs in the one-dimensional best-fit decreasing packing algorithm.

19. The manager PM of claim 16, wherein in order to classify the server PMs, the processor sorts all of the server PMs in order of resource utilization; the processor classifies the first i of the sorted server PMs as the redundant PMs and classifies the last (P−i) of the sorted server PMs as the surviving PMs, i is an integer and $1<=i<=P$, P is a number of all of the server PMs; the processor finds the largest i such that the VMs running on the redundant PMs can migrate to the surviving PMs successfully according to the interleaved N-dimensional best-fit decreasing packing algorithm.

20. The manager PM of claim 16, wherein in order to classify the server PMs, the processor sorts all of the server PMs, the server PMs with at least one VM satisfying a preset condition are after the server PMs without VMs satisfying the preset condition in the sorted order and the server PMs without VMs satisfying the preset condition are sorted in order of resource utilization; the processor classifies the first i of the sorted server PMs as the redundant PMs and classifies the last (P−i) of the sorted server PMs as the surviving PMs, i is an integer and $1<=i<=P$, P is a number of all of the server PMs; the processor finds the largest i such that the VMs running on the redundant PMs can migrate to the surviving PMs successfully according to the interleaved N-dimensional best-fit decreasing packing algorithm.

21. The manager PM of claim 16, wherein the interleaved N-dimensional best-fit decreasing packing algorithm comprises:
calculating a normalization factor corresponding to each of the resources based on consumptions of the resources of all of the VMs;
calculating normalized consumptions of the resources of each of the VMs running on the redundant PMs and representative consumptions of each of the VMs running on the redundant PMs based on the normalization factors;
putting each of the VMs running on the redundant PMs into one or more queues according to the normalized consumptions of the resources of each of the VMs;
sorting the VMs in each of the queues in decreasing order of the representative consumptions;
checking all of the queues and returning a result of success if all of the queues are empty;
selecting a queue from the queues according to normalized sums of residual capacities corresponding to the resources;
popping the first VM from the selected queue;
assigning the popped VM to the surviving PM with a smallest representative residual capacity that can accommodate the consumptions of all of the resources of the popped VM;
returning a result of failure if there is no surviving PM that can accommodate the consumptions of all of the resources of the popped VM; and
returning to the step of checking all of the queues.

22. The manager PM of claim 21, wherein the processor calculates the normalization factor corresponding to the i-th resource by subtracting a sum of the consumptions of the i-th resource of all of the VMs from a sum of capacities of the i-th resource of all of the surviving PMs, and then the processor divides the result of the subtraction by a number of the surviving PMs, i is an integer and $1<=i<=N$; the processor calculates the normalized consumption of the i-th resource of each of the VMs running on the redundant PMs by dividing the consumption of the i-th resource of the particular VM by the normalization factor corresponding to the i-th resource; the representative consumption of each of the VMs running on the redundant PMs is a largest normalized consumption among the normalized consumptions of the resources of the particular VM; the processor calculates the normalized sum of residual capacities corresponding to the i-th resource by dividing a sum of the residual capacities of the i-th resource of the surviving PMs by the normalization factor corresponding to the i-th resource.

23. The manager PM of claim 22, wherein there are N queues in total, and there is a one-to-one mapping relationship between the N queues and the N resources;
when putting the VMs running on the redundant PMs into the queues, the processor puts each of the VMs running on the redundant PMs into the queue corresponding to the resource corresponding to the representative consumption of the particular VM;
when selecting the queue from the queues, the processor defines a set comprising all of the queues except the queue corresponding to the resource corresponding to the smallest normalized sum of residual capacities, and the processor selects the queue in the set whose first VM has the largest representative consumption among the representative consumptions of the first VMs of the queues in the set.

24. The manager PM of claim 22, wherein there are $N*(N-1)$ queues in total, and each of the queues is corresponding to a different permutation of two of the N resources;
when putting the VMs running on the redundant PMs into the queues, the processor puts each one of the VMs running on the redundant PMs into the queue corresponding to the permutation of the i-th resource followed by the j-th resource when the normalized consumption of the i-th resource of the particular VM is larger than the normalized consumption of the j-th resource of the particular VM, wherein j is an integer, $1<=j<=N$ and j is not equal to i;
when selecting the queue from the queues, the processor selects the queue corresponding to the permutation of the resource corresponding to the largest normalized sum of residual capacities followed by the resource corresponding to the smallest normalized sum of residual capacities;

when popping the first VM from the selected queue, the processor removes the popped VM from all of the queues.

25. The manager PM of claim 21, wherein in order to assign the popped VM, the processor calculates the representative residual capacity of each of the surviving PMs, wherein the representative residual capacity of each of the surviving PMs is a minimum of normalized residual capacities of the resources of the particular PM, the processor calculates the normalized residual capacity of each of the resources of the particular PM by dividing the residual capacity of the particular resource of the particular PM by the normalization factor corresponding to the particular resource; the processor assigns the popped VM to the surviving PM with the smallest representative residual capacity that can accommodate the consumptions of all of the resources of the popped VM; the processor updates the residual capacities of the resources of the assigned PM by subtracting the consumptions of the resources of the popped VM from the residual capacities of the resources of the assigned PM.

26. The manager PM of claim 16, wherein each of the migration paths corresponds to one of the VMs running on the redundant PMs, the source of the particular migration path is the redundant PM on which the particular VM is running and the destination of the particular migration path is the surviving PM corresponding to the particular VM assigned by the interleaved N-dimensional best-fit decreasing packing algorithm, the processor determines the rest of the particular migration path according to the topology of the network.

27. The manager PM of claim 26, wherein in order to determine the parallel migration sequence, the processor defines a conflict graph and stores the conflict graph in the memory, wherein each node of the conflict graph represents one of the migration paths, each of the nodes has a weight representing an estimated time needed to migrate the VM corresponding to the particular node to the corresponding surviving PM, there is an edge between two nodes of the conflict graph if the two migration paths corresponding to the two nodes overlap in any part; the processor uses a maximum vertex-coloring algorithm on the conflict graph to find a coloring pattern of the nodes such that a sum of weights of colors of the coloring pattern is minimum, wherein the weight of each of the colors is a maximum of the weights of the nodes of the particular color; the processor adds the migration paths corresponding to the nodes of each of the colors as a batch of migration paths into the parallel migration sequence.

28. The manager PM of claim 26, wherein in order to determine the parallel migration sequence, the processor defines a directed graph according to the migration paths and the topology of the network, and stores the directed graph in the memory; the processor finds a maximum set of disjoint paths in the directed graph and adds the migration paths corresponding to the maximum set of disjoint paths as a batch of migration paths into the parallel migration sequence; the processor removes edges corresponding to the maximum set of disjoint paths from the directed graph; the processor returns to the step of finding a maximum set of disjoint paths if there is at least one edge still existing in the directed graph.

29. The manager PM of claim 26, wherein in order to determine the parallel migration sequence, the processor defines a bipartite graph according to the migration paths and stores the bipartite graph in the memory; the processor finds a maximum matching in the bipartite graph and adds the migration paths corresponding to the maximum matching as a batch of migration paths into the parallel migration sequence; the processor removes edges corresponding to the maximum matching from the bipartite graph; the processor returns to the step of finding a maximum matching if there is at least one edge still existing in the bipartite graph.

30. The manager PM of claim 16, wherein in order to migrate the VMs running on the redundant PMs, the processor selects a first batch of migration paths in the parallel migration sequence; the processor migrates the VMs corresponding to the selected batch to the surviving PMs in parallel according to the migration paths of the selected batch; if there is at least one batch of migration paths after the selected batch, the processor selects a next batch of migration paths in the parallel migration sequence and returns to the step of migrating the VMs corresponding to the selected batch.

* * * * *